UNITED STATES PATENT OFFICE.

LOUIS P. BRAND, OF NEW ORLEANS, LOUISIANA, ASSIGNOR OF ONE-HALF HIS RIGHT TO AUGUSTE WILLOZ, OF SAME PLACE.

IMPROVEMENT IN MEDICAL COMPOSITIONS.

Specification forming part of Letters Patent No. 167,737, dated September 14, 1875; application filed June 1, 1875.

*To all whom it may concern:*

Be it known that I, LOUIS P. BRAND, of New Orleans, in the parish of Orleans and State of Louisiana, have invented a new and valuable Improvement in Medical Compounds; and I do hereby declare that the following is a full, clear, and exact description of the same.

My invention relates to medical compounds; and consists in the novel combination of the ingredients hereinafter mentioned, and in the manner substantially as specified.

I first take one ounce of simaruba and one-half ounce of dog-grass and place them in one pint of boiling rain-water. I continue the boiling process until the fluid is reduced to one-half its original bulk by evaporation. I next strain the decoction carefully, so as to exclude all the bark, and set it aside to cool. After the mixture becomes thoroughly cooled I add to it eighteen grains of nitrate of potassa. The compound is then ready for use.

This preparation is found of great value as a remedy for dysentery.

The proportions mentioned, and the mode of preparation, may be varied somewhat; but I prefer the formula substantially as set forth.

What I claim as new, and desire to secure by Letters Patent, is—

The composition of matter for medicine consisting of simaruba, dog-grass, and nitrate of potassa, substantially as specified.

In testimony that I claim the above I have hereunto subscribed my name in the presence of two witnesses.

L. P. BRAND.

Witnesses:
    GEORGE E. UPHAM,
    JOHN B. CORLISS.